United States Patent
Pham Van et al.

(10) Patent No.: US 11,722,672 B2
(45) Date of Patent: Aug. 8, 2023

(54) ADAPTIVELY DERIVING RICE PARAMETER VALUES FOR HIGH BIT-DEPTH VIDEO CODING

(71) Applicant: QUALCOMM Incorporated, San Diego, CA (US)

(72) Inventors: Luong Pham Van, San Diego, CA (US); Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/494,418

(22) Filed: Oct. 5, 2021

(65) Prior Publication Data
US 2022/0109844 A1    Apr. 7, 2022

Related U.S. Application Data

(60) Provisional application No. 63/088,010, filed on Oct. 6, 2020, provisional application No. 63/090,615, filed on Oct. 12, 2020.

(51) Int. Cl.
*H04N 19/13* (2014.01)
*H04N 19/176* (2014.01)
(Continued)

(52) U.S. Cl.
CPC .......... *H04N 19/13* (2014.11); *H04N 19/176* (2014.11); *H04N 19/18* (2014.11); *H04N 19/91* (2014.11)

(58) Field of Classification Search
None
See application file for complete search history.

(56) References Cited

U.S. PATENT DOCUMENTS 10,616,604 B2    4/2020    Zhang et al.
2016/0286215 A1  9/2016    Gamei et al.
(Continued)

OTHER PUBLICATIONS

Browne (Sony) A., et al., "AHG12: Rice Parameter Selection for High bit Depths", 20. JVET Meeting, Oct. 7, 2020-Oct. 16, 2020, Teleconference, (The Joint Video Exploration Team of ISO/IEC JTC1/SC29/WG11 and ITU-T SG.16), No. JVET-T0072, Sep. 30, 2020 (Sep. 20, 2020), 9 Pages, XP030293490, Retrieved from the Internet: URL: https://jvet-experts.org/doc_end_user/documents/20_Teleconference/wg11/JVET-T0072-v1.zip, JVET-T0072/JVET-T0072. docx retrieved on Sep. 30, 2020].
(Continued)

*Primary Examiner* — Dave Czekaj
*Assistant Examiner* — Shanika M Brumfield
(74) *Attorney, Agent, or Firm* — Shumaker & Sieffert, PA

(57) ABSTRACT

An example device for binarizing video data includes a memory configured to store video data; and one or more processors implemented in circuitry and configured to: calculate a local sum of absolute values (locSumAbs value) of neighboring coefficients to a current coefficient of a current block of video data; derive a shift value from the locSumAbs value; normalize the locSumAbs value using the shift value; determine a Rice parameter using the normalized locSumAbs value; and binarize or inverse binarize the current coefficient using the Rice parameter. In this manner, these techniques may allow for more appropriate Rice parameter value selection when binarizing high bitdepth data in conjunction with performing context-adaptive binary arithmetic coding (CABAC).

35 Claims, 9 Drawing Sheets

(51) Int. Cl.
*H04N 19/18* (2014.01)
*H04N 19/91* (2014.01)

(56) References Cited

U.S. PATENT DOCUMENTS

| | | | |
|---|---|---|---|
| 2020/0077117 | A1 | 3/2020 | Karczewicz et al. |
| 2020/0267389 | A1 | 8/2020 | George et al. |
| 2021/0037261 | A1 | 2/2021 | Hsiang |
| 2022/0286691 | A1* | 9/2022 | Choi .................. H04N 19/132 |
| 2022/0303327 | A1* | 9/2022 | Auyeung ............... H04L 65/61 |
| 2022/0321886 | A1* | 10/2022 | Schwarz ............... H04N 19/70 |

OTHER PUBLICATIONS

International Search Report and Written Opinion—PCT/US2021/053770—ISA/EPO—dated Jan. 28, 2022, 14 pp.
Van L.P., et al., "AHG12: On the Rice Parameter Derivation for High Bit-Depth Coding", JVET-T0105_v1, 20. JVET Meeting, Oct. 7, 2020-Oct. 16, 2020, Teleconference, (The Joint Video Exploration Team of ISO/IEC JTC1/SC29/WG11 and ITU-T SG.16), No. JVET-T0105, Oct. 7, 2020 (Oct. 7, 2020), 6 Pages, XP030289942, Retrieved from the Internet: URL: http://phenix.int-evry.fr/jvet/doc_end_user/documents/20_Teleconference/wg11/JVET-T0105-v1.zip.
Bossen F., et al., "VVC Operation Range Extensions (Draft 3)", JVET-V2005-v1, Joint Video Experts Team (JVET) of ITU-T SG 16 WP 3 and ISO/IEC JTC 1/SC 29, 22nd Meeting, by Teleconference, Apr. 20-28, 2021, pp. 1-19.
Bross B., et al., "Versatile Video Coding (Draft 10)", JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 Pages.
Bross B., et al., "Versatile Video Coding (Draft 9)," 130th MPEG Meeting, 18th JVET Meeting, Apr. 15, 2020-Apr. 24, 2020, Alpbach, (Motion Picture Expert Group or ISO/IEC JTC1/SC29/WG11 and JVET of ITU-T SG 16 WP 3 and ISO/IEC JTC 1/SC 29/WG 11), No. m53983, JVET-R2001-v8, May 6, 2020 (May 6, 2020), XP030287934, 524 pages, Retrieved from the Internet: URL: http://phenix.int-evry.fr/mpeg/doc_end_user/documents/130_Alpbach/wg11/m53983-JVET-R2001-v8-JVET-R2001-v8.zip JVET-R2001-v8.docx [retrieved on May 6, 2020].
Browne A., et al., "CE on Entropy Coding for High Bit Depth and High Bit Rate Coding", JVET-U2022_r4, Joint Video Experts Team (JVET) of ITU-T SG 16 WP 3 and ISO/IEC JTC 1/SC 29, 21st Meeting, by Teleconference, Jan. 6-15, 2021, pp. 1-9.
Browne A., et al., "Common Test Conditions for High Bit Depth and High Bit Rate Video Coding", JVET-U2018-v2, Joint Video Experts Team (JVET) of ITU-T SG 16 WP 3 and ISO/IEC JTC 1/SC 29, 21st Meeting, by Teleconference, Jan. 6-15, 2021, pp. 1-8.
Browne A., et al., "High Bit Depth Coding", JVET-R0351, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-24.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A001, Feb. 24, 2016 (Feb. 24, 2016), XP030150000, 27 Pages, URL: http://phenix.int-evry.fr/jvet/.
Ikai T., et al., "AHG12: Preliminary Common Test Conditions for High Bitdepth Video Coding", JVET-T0047_v3, Joint Video Experts Team (JVET) of ITU-T SG 16 WP 3 and ISO/IEC JTC 1/SC 29, 20th Meeting: by Teleconference, Oct. 7, 2016 Oct. 2020, pp. 1-7.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
Rusanovskyy D., et al., "CE-related: On History-Enhanced Method of Rice Parameter Derivation for Regular Residual Coding (RRC) at High Bit Depths", JVET-V0106, Joint Video Experts Team (JVET), of ITU-T SG 16 WP 3 and ISO/IEC JTC 1/SC 29, 22nd Meeting, by Teleconference, Apr. 20-28, 2021, pp. 1-9.
Van L.P., et al., "AHG12: On the Rice Parameter Derivation for High Bit-Depth Coding", JVET-T0105_v2, Joint Video Experts Team (JVET) of ITU-T SG 16 WP 3 and ISO/IEC JTC 1/SC 29, 20th Meeting, by Teleconference, Oct. 7-16, 2020, pp. 1-7.

* cited by examiner

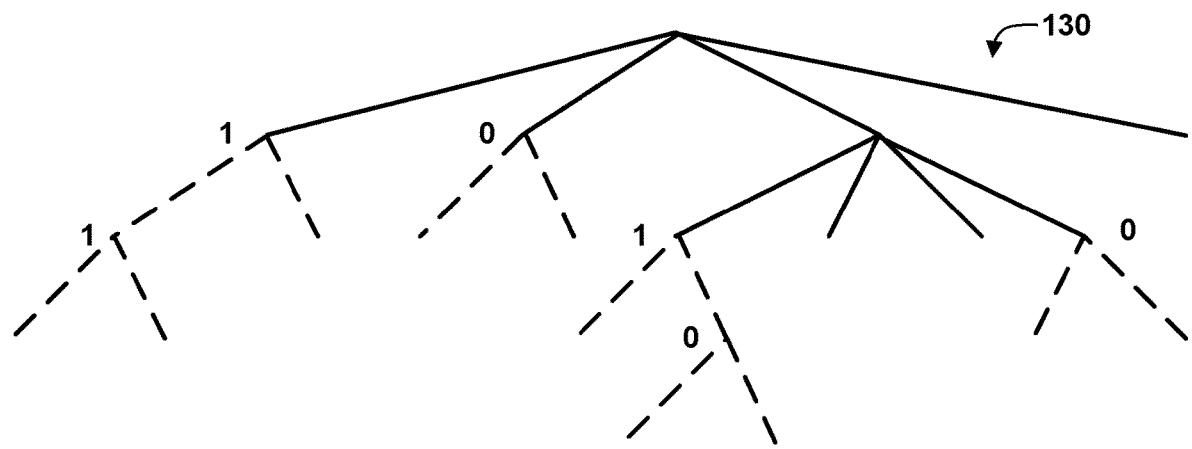
FIG. 2A – PRIOR ART
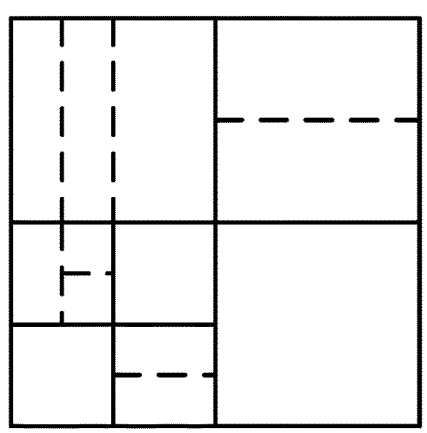
FIG. 2B – PRIOR ART

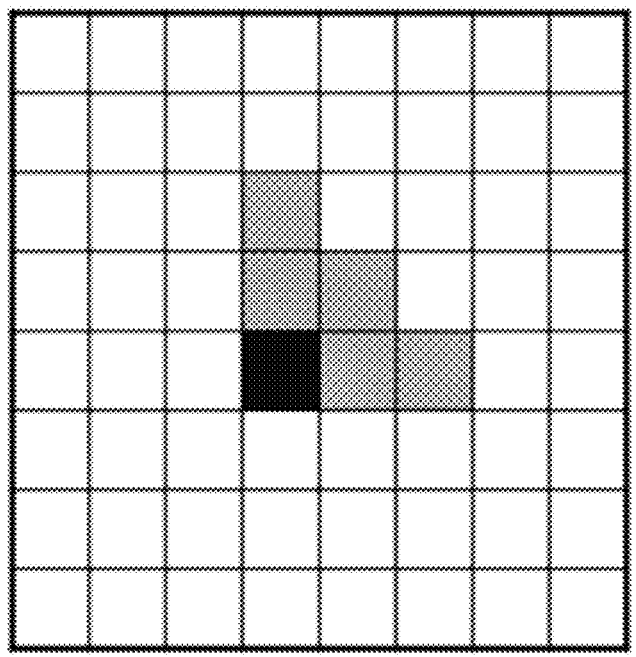
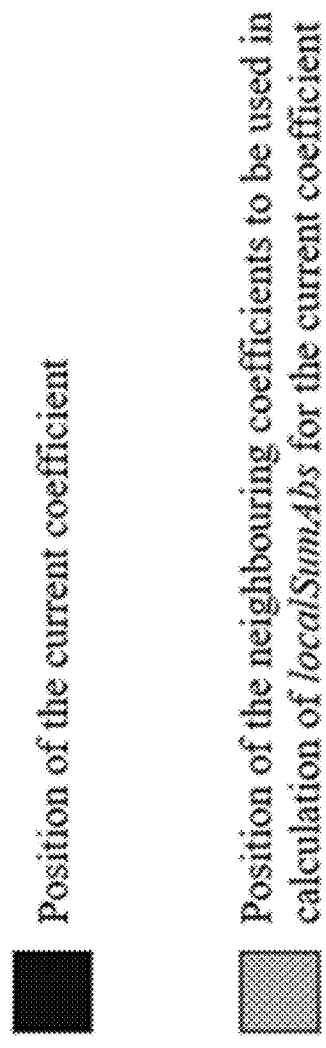
FIG. 5

ADAPTIVELY DERIVING RICE PARAMETER VALUES FOR HIGH BIT-DEPTH VIDEO CODING

This application claims the benefit of U.S. Provisional Application No. 63/088,010, filed Oct. 6, 2020, and U.S. Provisional Application No. 63/090,615, filed Oct. 12, 2020, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, a-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for adaptively deriving a Rice parameter value for regular residual coding (RRC) in high bit-depth video coding. In particular, these techniques generally include deriving a shift value from a calculated local sum of absolute values (locSumAbs value), normalizing the locSumAbs value using the shift value, and deriving a Rice parameter from the normalized locSumAbs value. These techniques may be incorporated into an extension to ITU-T H.266/Versatile Video Coding (VVC) or other video coding standards.

In one example, a method of binarizing video data includes calculating a local sum of absolute values (locSumAbs value) of neighboring coefficients to a current coefficient of a current block of video data; deriving a shift value from the locSumAbs value; normalizing the locSumAbs value using the shift value to generate a normalized locSumAbs value; determining a Rice parameter using the normalized locSumAbs value; and binarizing or inverse binarizing the current coefficient using the Rice parameter.

In another example, a device for binarizing video data includes a memory configured to store video data; and one or more processors implemented in circuitry and configured to: calculate a local sum of absolute values (locSumAbs value) of neighboring coefficients to a current coefficient of a current block of video data; derive a shift value from the locSumAbs value; normalize the locSumAbs value using the shift value to generate a normalized locSumAbs value; determine a Rice parameter using the normalized locSumAbs value; and binarize or inverse binarize the current coefficient using the Rice parameter.

In another example, a computer-readable storage medium has stored thereon instructions that, when executed, cause a processor to calculate a local sum of absolute values (locSumAbs value) of neighboring coefficients to a current coefficient of a current block of video data; derive a shift value from the locSumAbs value; normalize the locSumAbs value using the shift value to generate a normalized locSumAbs value; determine a Rice parameter using the normalized locSumAbs value; and binarize or inverse binarize the current coefficient using the Rice parameter.

In another example, a device for binarizing video data includes means for calculating a local sum of absolute values (locSumAbs value) of neighboring coefficients to a current coefficient of a current block of video data; means for deriving a shift value from the locSumAbs value; means for normalizing the locSumAbs value using the shift value to generate a normalized locSumAbs value; means for determining a Rice parameter using the normalized locSumAbs value; and means for binarizing or inverse binarizing the current coefficient using the Rice parameter.

The details of one or more examples are set forth in the accompanying drawings and the description below. Other features, objects, and advantages will be apparent from the description, drawings, and claims.

BRIEF DESCRIPTION OF DRAWINGS

FIGS. 2A and 2B are conceptual diagrams illustrating an example quadtree binary tree (QTBT) structure, and a corresponding coding tree unit (CTU).

FIG. 5 is a conceptual diagram illustrating an example set of neighboring coefficients that may be used when calculating a local sum of neighboring absolute values (localSumAbs) for a current coefficient.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. High-Efficiency Video Coding (HEVC), was finalized by the Joint Collaboration Team on Video Coding (JCT-VC) of ITU-T Video Coding Experts Group (VCEG) and ISO/IEC Motion Picture Experts Group (MPEG) in April 2013.

The Joint Video Experts Team (WET), a collaborative team formed by MPEG and ITU-T Study Group 16's VCEG is recently working on a new video coding standard to be known as Versatile Video Coding (VVC). The primary objective of VVC is to provide a significant improvement in compression performance over the existing HEVC standard, aiding in deployment of higher-quality video services and emerging applications such as 360° omnidirectional immersive multimedia and high-dynamic-range (I-IDR) video. The development of the VVC standard was completed in 2020. A draft of VVC can be found at phenix.it-sudparis.eu/jvct/doc_end_user/documents/19_Teleconference/wg11/JVET-S2001-v17.zip.

This disclosure recognizes that in one example draft of the VVC specification, the Rice parameter has been extensively tested for encoding video sources of 8 bit-depth or 10 bit-depth. In an example design, the Rice parameter value depends on the value of locSumAbs, and is limited in range from 0 to 3 by clipping. When the bitdepth of the input video is increased, the extended precision is enabled, or the quantization parameter is set very low, the range of the coefficients, and therefore, locSumAbs value, may significantly increase. In such cases, some ranges of allowed Rice parameter values in example drafts of VVC are not sufficient. This limitation may cause a coding performance drop in VVC and other video coding standards when using high bit-depth coding. Thus, this disclosure describes techniques by which the Rice parameter range may be increased, e.g., for high bit-depth video coding.

Figure 1:
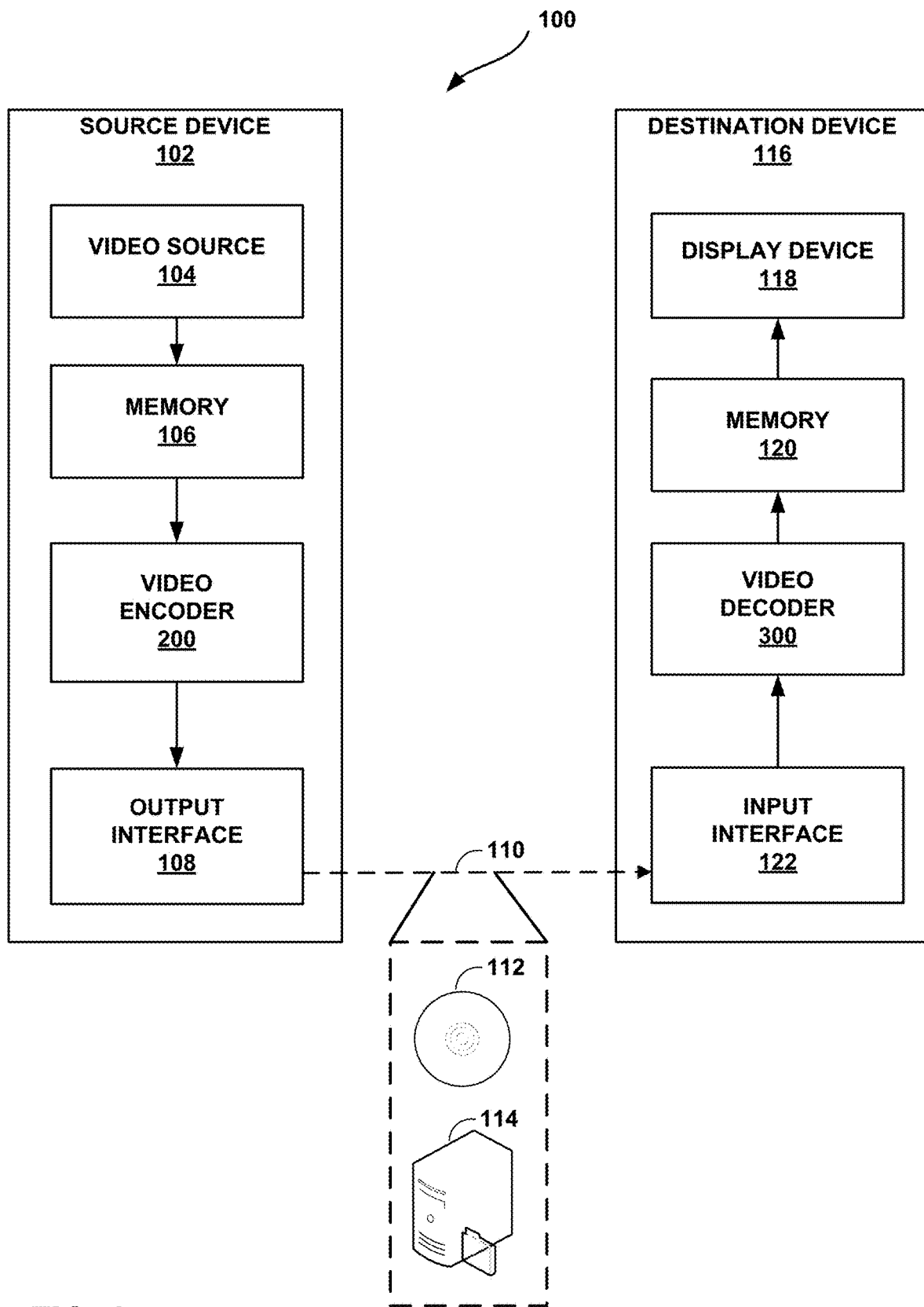
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptively deriving Rice parameters for high bit-depth video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for adaptively deriving Rice parameters for high bit-depth video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both, that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee®), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting, 15-24 April, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. The component may be an array or single sample from one of three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may initially binarize values to be encoded, i.e., by forming a string of binary values, also referred to as "bins." Video encoder 200 may assign a context within a context model to a symbol to be transmitted, e.g., each of the bins. The context may relate to, for example, whether neighboring values of the symbol are zero-valued or not. The probability determination may be based on a context assigned to the symbol.

In the case of transform coefficient coding, video encoder 200 and video decoder 300 may code values for syntax elements representing a level value for a transform coefficient. In some examples, such syntax elements include a significant coefficient flag (indicating whether the absolute value of the transform coefficient level is greater than zero), a greater than one flag (indicating whether the absolute value of the transform coefficient level is greater than one), a greater than two flag (indicating whether the absolute value of the transform coefficient level is greater than two), and a remaining level value representing the actual value of the transform coefficient if the transform coefficient level has an absolute value greater than two. Video encoder 200 and video decoder 300 may binarize the remaining level value using a Golomb-Rice code and a determined Rice parameter.

Video encoder 200 and video decoder 300 may determine the Rice parameter for a current transform coefficient using values of other transform coefficients in a neighborhood around the current transform coefficient. That is, video encoder 200 and video decoder 300 may determine the Rice parameter according to neighboring transform coefficients to the current transform coefficient, i.e., transform coefficients in the neighborhood. For example, video encoder 200 and video decoder 300 may determine the Rice parameter according to values for transform coefficients immediately to the right of the current transform coefficient, two to the right of the current transform coefficient, below and to the right of the current transform coefficient, immediately below the current transform coefficient, and two below the current transform coefficient. Video encoder 200 and video decoder 300 may calculate a sum of the values of the absolute values of these transform coefficients, where such sum may be referred to as a "local sum of absolute values" or a "locSumAbs" value.

In accordance with the techniques of this disclosure, rather than immediately performing a lookup for a Rice parameter in a lookup table using the locSumAbs value, video encoder 200 and video decoder 300 may derive a shift value from the locSumAbs value and normalize the locSumAbs value using the shift value. For example, the shift value may represent a number of bits by which to perform a bitwise right-shift of the locSumAbs value. Video encoder 200 and video decoder 300 may then perform a lookup in the lookup table for the Rice parameter using the normalized locSumAbs value. Video encoder 200 and video decoder 300 may then binarize (or inverse binarize) the current transform coefficient using the determined Rice parameter.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

According to the techniques of this disclosure, a video coder, such as video encoder 200 and video decoder 300, may be configured to perform Rice parameter derivation in an improved manner relative to conventional VVC. That is, video encoder 200 and video decoder 300 may be configured to derive Rice parameters in various input bit-depths for video data. These techniques may improve compression efficiency of coding designs.

In one example, video encoder 200 and video decoder 300 may scale and/or normalize localSumbAbs (which may be the same as locSumAbs) to handle a bitdepth increase or dynamic range of transform coefficients before being used to derive a Rice parameter. For example, such scaling and/or normalization may impact equation 1517 of the VVC specification as shown below. The amount of the scaling factor may depend on the input bit depth, predefined operational bit depth, e.g., 10, or local activity of transform coefficients, block size, or video encoder 200 may signal a value for a syntax element in the bitstream. Then video encoder 200 and video decoder 300 may clip the localSumAbs to a certain range, e.g., using the current clipping of localSumAbs in VVC. Then, video encoder 200 and video decoder 300 may use the normalized and clipped localSumAbs to derive the Rice parameter using a predefined lookup table, e.g., the current look up table in VVC. Table 128. With localSumAbs being normalized in the first step of the proposed design, video encoder 200 and video decoder 300 may derive the Rice parameter from a predefined Table, e.g., from Table 128 of VVC. Finally, video encoder 200 and video decoder 300 may modify the value of localSumAbs by adding an offset to extend the dynamic range of the Rice parameter range.

Video encoder 200 and video decoder 300 may be configured according to a modified version of the VVC specification as follows, where added text is indicated using "[added: "added text"]":

9.3.3.2 Rice parameter derivation process for abs_remainder[ ] and dec_abs_level[ ]

Inputs to this process are the base level baseLevel, the colour component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight.

Output of this process is the Rice parameter cRiceParam.

Given the array AbsLevel[x][y] for the transform block with component index cIdx and the top-left luma location (x0, y0), the variable locSumAbs is derived as specified by the following pseudo-code process:

```
locSumAbs = 0
if( xC < ( 1 << log2TbWidth ) - 1 ) {
    locSumAbs += AbsLevel[ xC + 1 ][ yC ]
    if( xC < ( 1 << log2TbWidth ) - 2 )
        locSumAbs += AbsLevel[ xC + 2 ][ yC ]
    if( yC < ( 1 << log2TbHeight ) - 1 )
        locSumAbs += AbsLevel[ xC + 1 ][ yC + 1 ]     (1517)
}
if( yC < ( 1 << log2TbHeight ) - 1 ) {
    locSumAbs += AbsLevel[ xC ][ yC+ 1 ]
    if( yC < ( 1 << log2TbHeight ) - 2 )
        locSumAbs += AbsLevel[ xC ][ yC + 2 ]
}
[added: "shift = (Bitdepth - b) > 0 ? Floor(Log2(a*(Bitdepth - b))) : 0
localSumAbs = (shift == 0) ? localSumAbs : (localSumAbs + (1 << (shift -1) ))
>> shift"]
locSumAbs = Clip3( 0, 31, locSumAbs - baseLevel * 5 )
```

Given the variable locSum Abs, the Rice parameter cRiceParam is derived as specified in Table 128.

cRiceParam is then refined as:

[added: "cRiceParam = cRiceParam + c"]

In some examples, variables a, b and c above can be defined as follows: In one example, the variable "b" may specify an operation bit depth and be set equal to, e.g., 10; the variable "a" may be set equal to an integer value, e.g., 4, or another value of a power of 2; and the variable "c" may be set equal to the computed shift value, or derived from the shift value. The operators "<<" and ">>" represent bitwise left and right shift operators, and the "A?B:C" operator indicates that if A is true, value B is returned, whereas if A is false, value C is returned.

In another example, localSumAbs may be scaled/normalized when it is larger than or equal to a threshold. In this case, the related Rice parameter derivation section of VVC may be accordingly changed as follows (where "[added: "added text"]" signifies additions to VVC):

9.3.3.2 Rice parameter derivation process for abs_remainder[ ] and dec_abs_level[ ]

Inputs to this process are the base level baseLevel, the colour component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight.

Output of this process is the Rice parameter cRiceParam.

Given the array AbsLevel[x][y] for the transform block with component index cIdx and the top-left luma location (x0, y0), the variable locSumAbs is derived as specified by the following pseudo-code process:

```
locSumAbs = 0
if( xC < ( 1 << log2TbWidth ) - 1 ) {
    locSumAbs += AbsLevel[ xC + 1 ][ yC ]
    if( xC < ( 1 << log2TbWidth ) - 2 )
        locSumAbs += AbsLevel[ xC + 2 ][ yC ]
    if( yC < ( 1 << log2TbHeight ) - 1 )
        locSumAbs += AbsLevel[ xC + 1 ][ yC + 1 ]          (1517)
}
if( yC < ( 1 << log2TbHeight ) - 1 ) {
    locSumAbs += AbsLevel[ xC ][ yC + 1 ]
    if( yC < ( 1 << log2TbHeight ) - 2 )
        locSumAbs += AbsLevel[ xC ][ yC + 2 ]
}
[added: "shift = ((Bitdepth - b) > 0) && (localSumAbs - baseLevel * 5) >= T ?
Floor(Log2(a*(Bitdepth - b))) : 0
localSumAbs = (shift == 0) ? localSumAbs : (localSumAbs + (1 << (shift -1) ))
    >> shift"]
locSumAbs = Clip3( 0, 31, locSumAbs - baseLevel *5 )
        Given the variable locSumAbs, the Rice parameter cRiceParam is
derived as specified in Table 128.
        cRiceParam is then refined as:
                [added: "cRiceParam = cRiceParam + c"]
```

In this example, T is a predefined threshold value. In one example, T may be set equal to 32. In some examples, values of variables a, b, and c can be signaled through bitstreams or set dependent on or derived from bitdepth, local statistics, e.g., min/max or mean of the transform coefficients values within the current block, decoded transform, block size, or syntax elements signalled in the bitstream.

2TbWidth, and the binary logarithm of the transform block height log 2TbHeight.

Output of this process is the Rice parameter cRiceParam.

Given the array AbsLevel[x][y] for the transform block with component index cIdx and the top-left luma location (x0, y0), the variable locSumAbs is derived as specified by the following pseudo-code process:

```
locSumAbs = 0
    if( xC < ( 1 << log2TbWidth ) - 1 ) {
        locSumAbs += AbsLevel[ xC + 1 ][ yC ]
        if( xC < ( 1 << log2TbWidth ) - 2 )
            locSumAbs += AbsLevel[ xC + 2 ][ yC ]
        if( yC < ( 1 << log2TbHeight ) - 1 )
            locSumAbs += AbsLevel[ xC + 1 ][ yC + 1 ]          (1517)
    }
    if( yC < ( 1 << log2TbHeight) - 1 ) {
        locSumAbs += AbsLevel[ xC ][ yC + 1 ]
        if( yC < ( 1 << log2TbHeight ) - 2 )
            locSumAbs += AbsLevel[ xC ][ yC + 2 ]
    }
[added: "shift = ((Bitdepth - b) > 0) && (localSumAbs - baseLevel * 5) >= T ?
    Floor(Log2(a*(Bitdepth - b))) : 0
localSumAbs = (shift == 0) ? localSumAbs : (localSumAbs + (1 << (shift -1) ))
    >> shift
shift1 = ((Bitdepth - b) > 0) && (localSumAbs - baseLevel * 5) >= T ?
    Floor(Log2(a*(Bitdepth - b))) : 0
localSumAbs = (shift1 == 0) ? localSumAbs : (localSumAbs + (1 << (shift1 -1) ))
    >> shift1"]
    locSumAbs = Clip3( 0, 31, locSumAbs - baseLevel * 5 )
Given the variable locSumAbs, the Rice parameter cRiceParam is derived as
    specified in Table 128.
cRiceParam is then is refined as:
                [added: "cRiceParam = cRiceParam + c"]
```

In another example, video encoder 200 and video decoder 300 may normalize the localSumAbs value a second time, e.g., as follows (where "[added: "added text"]" signifies additions to VVC):

9.3.3.2 Rice parameter derivation process for abs_remainder[ ] and dec_abs_level[ ]

Inputs to this process are the base level baseLevel, the colour component index cIdx, the luma location (x0, y0) specifying the top-left sample of the current transform block relative to the top-left sample of the current picture, the current coefficient scan location (xC, yC), the binary logarithm of the transform block width log In the example above, video encoder 200 and video decoder 300 may set the value of c equal to (shift+shift1).

In another example, video encoder 200 and video decoder 300 may normalize the locSumAbs value by a factor that depends on the locSumAbs magnitude and the input bit-depth. In this case, video encoder 200 and video decoder 300 may use a modified technique for deriving the related Rice parameter (relative to the corresponding portion of VVC Draft 10), e.g., changed as follows where [added: "added text"] represents additions relative to VVC Draft 10:

9.3.3.2 Rice parameter derivation process for abs_remainder[ ] and dec_abs_level[ ]

Inputs to this process are the base level baseLevel, the colour component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight.

Output of this process is the Rice parameter cRiceParam.

Given the array AbsLevel[x][y] for the transform block with component index cIdx and the top-left luma location (x0, y0), the variable locSumAbs is derived as specified by the following pseudo-code process:

```
locSumAbs = 0
if( xC < ( 1 << log2TbWidth ) − 1 ) {
    locSumAbs += AbsLevel[ xC + 1 ][ yC ]
    if( xC < ( 1 << log2TbWidth ) − 2 )
        locSumAbs += AbsLevel[ xC + 2 ][ yC ]
    if( yC < ( 1 << log2TbHeight ) − 1 )
        locSumAbs += AbsLevel[ xC + 1 ][ yC + 1 ]       (1517)
}
if( yC < ( 1 << log2TbHeight ) − 1 ) {
    locSumAbs += AbsLevel[ xC ][ yC + 1 ]
    if( yC < ( 1 << log2TbHeight ) − 2 )
        locSumAbs += AbsLevel[ xC ][ yC + 2 ]
}
[added: "The variable shift and locSumAbs are derived as follows:
    shift = (locSumAbs * scl) >= T ? FloorLog2((locSumAbs * scl) >> N) : 0
    locSumAbs = locSumAbs >> shift
The variable locSumAbs is then updated as follows:"]
    locSumAbs = Clip3( 0, 31, locSumAbs − baseLevel * 5 )
        Given the variable locSumAbs, the Rice parameter cRiceParam is derived as
specified in Table 128.
        cRiceParam is then is refined as:
                [added: "cRiceParam = cRiceParam + shift"]
```

In some examples according to the example above, video encoder 200 and video decoder 300 may determine values of threshold T, scl, and N according to a bitdepth for the bitstream. Alternatively, video encoder 200 and video decoder 300 may use predefined values for T, scl, and N. Alternatively, video encoder 200 may signal values for T, scl, and N at a sequence, picture, or slice level (e.g., using a sequence parameter set (SPS), picture parameter set (PPS), adaptation parameter set (APS), or slice header), and video decoder 300 may determine the values of T, scl, and N from the signaled data.

In one example, scl may be defined as:

*Scl*=floor Log 2(bitdepth−10).

Furthermore, T may be set equal to 8, and N may be set equal to 3.

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, since the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
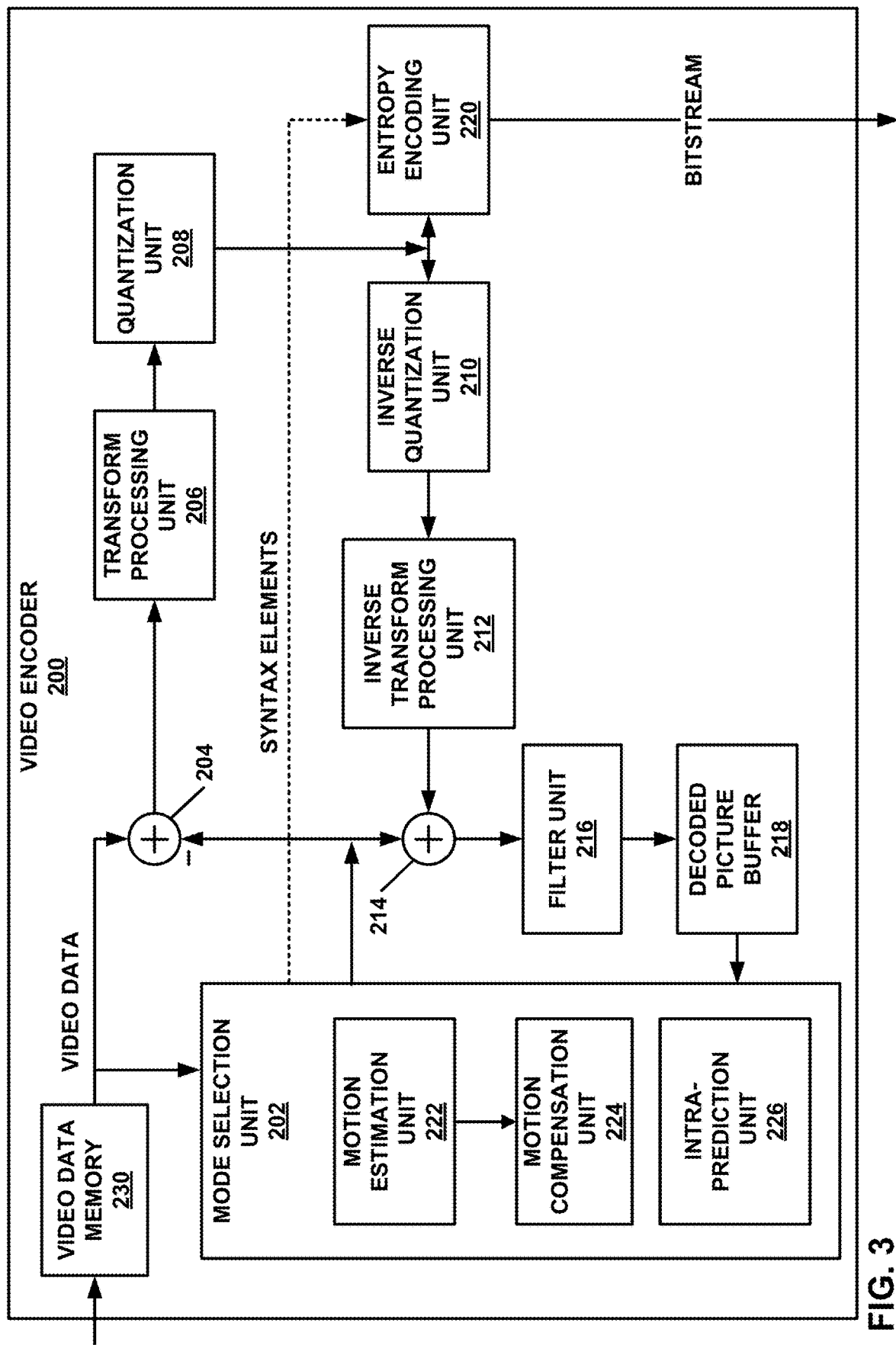
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the ITU-T H.265/HEVC video coding standard and the VVC video coding standard in development. However, the techniques of this disclosure are not limited to these video coding standards and are applicable generally to other video encoding and decoding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes motion estimation unit 222, motion compensation unit 224, and intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead may generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block. e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

According to the techniques of this disclosure, entropy encoding unit 220 may be configured to binarize an absolute value of a remaining level value of a current quantized transform coefficient using a Rice parameter. Entropy encoding unit 220 may determine the Rice parameter first by determining a local sum of absolute values (locSumAbs) of neighboring transform coefficients to the current quantized transform coefficient. Such neighboring transform coefficients may be those shown in the example of FIG. 5 below. That is, the neighboring transform coefficients may include a right-neighboring transform coefficient, a two-to-the-right-neighboring transform coefficient, a below-right-neighboring transform coefficient, a below-neighboring transform coefficient, and a two-below-neighboring transform coefficient.

After calculating the locSumAbs value, entropy encoding unit 220 may derive a shift value from the locSumAbs value. For example, entropy encoding unit 220 may calculate the shift value according to "shift=((Bitdepth−b)>0) && (localSumAbs−baseLevel*5)>=T?Floor(Log 2(a*(Bitdepth−b))):0." In this example, Bitdepth represents a bitdepth of the video data, a is an integer power of two value, b represents an operation bit depth, and T represents a threshold value.

After determining the shift value, entropy encoding unit 220 may normalize the calculated locSumAbs value using the shift value. For example, entropy encoding unit 220 may normalize the locSumAbs value according to "localSumAbs=(shift=0)?localSumAbs:(localSumAbs+(1<<(shift−1)))>>shift." In this example, "<<" and ">>" represent bitwise left and right shift operators. In both examples above, the "A?B:C" function indicates that if A is true, value B is returned, whereas if A is false, value C is returned. Entropy encoding unit 220 may also clip the normalized locSumAbs value according to "locSumAbs=Clip3(0, 31, locSumAbs−baseLevel*5)."

After calculating the normalized locSumAbs value, entropy encoding unit 220 may perform a lookup in a lookup table, using the normalized locSumAbs value as input, to determine a Rice parameter (e.g., cRiceParam). The lookup table may be the same as currently in VVC and reproduced below as Table 1. Entropy encoding unit 220 may binarize the absolute remainder value of the current transform coefficient using the determined Rice parameter, then entropy encode the binarized absolute remainder value.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 represents an example of a device for binarizing video data, the device including a memory configured to store video data; and one or more processors implemented in circuitry and configured to: calculate a local sum of absolute values (locSumAbs value) of neighboring coefficients to a current coefficient of a current block of video data; derive a shift value from the locSumAbs value; normalize the locSumAbs value using the shift value; determine a Rice parameter using the normalized locSum- Abs value; and binarize or inverse binarize the current coefficient using the Rice parameter.

Figure 4:
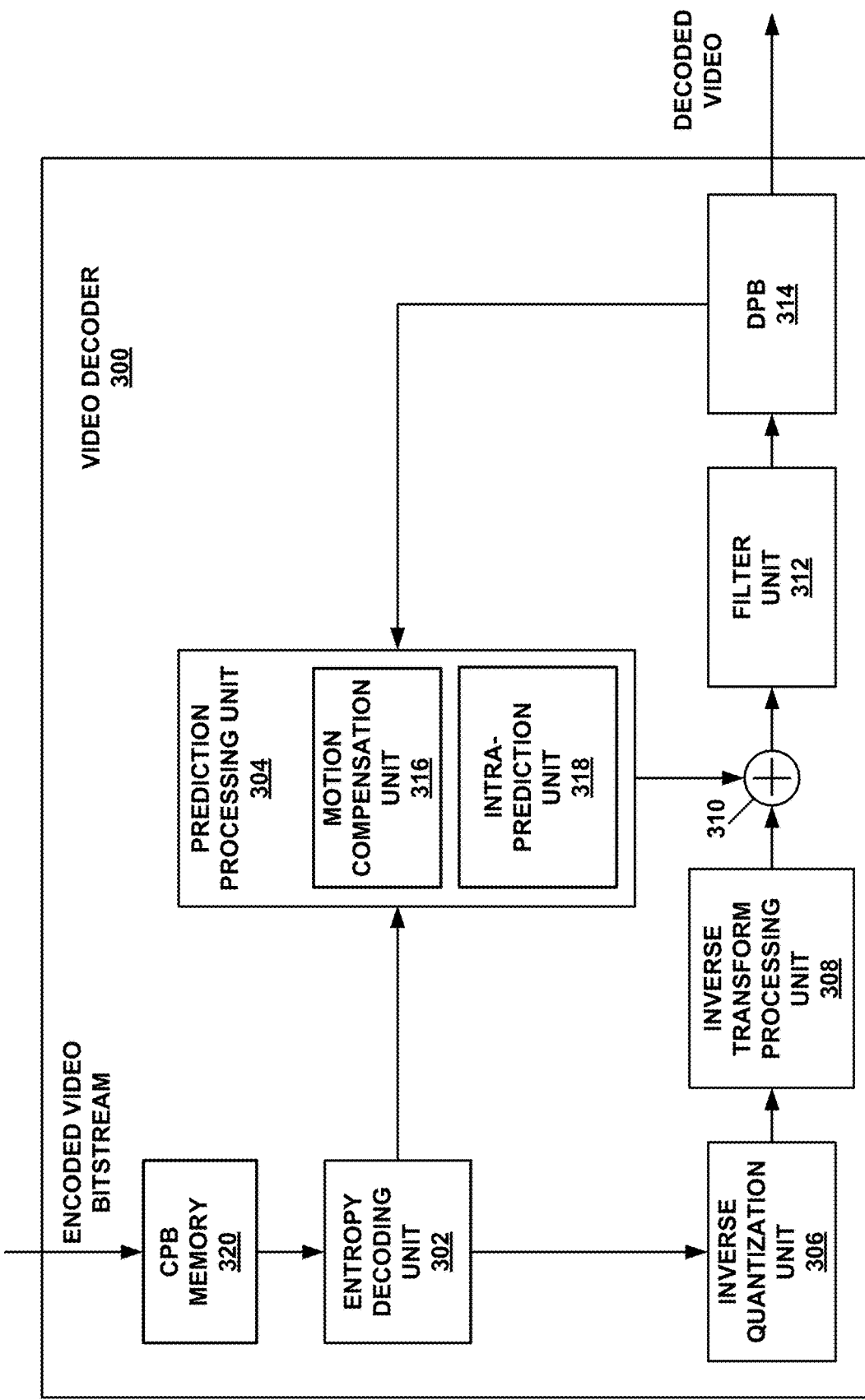
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). According to the techniques of this disclosure, entropy decoding unit 302 may be configured to entropy decode and then inverse binarize an absolute value of a remaining level value of a current quantized transform coefficient using a Rice parameter.

Entropy decoding unit 302 may determine the Rice parameter first by determining a local sum of absolute values (locSumAbs) of neighboring transform coefficients to the current quantized transform coefficient. Such neighboring transform coefficients may be those shown in the example of FIG. 5 below. That is, the neighboring transform coefficients may include a right-neighboring transform coefficient, a two-to-the-right-neighboring transform coefficient, a below-right-neighboring transform coefficient, a below-neighboring transform coefficient, and a two-below-neighboring transform coefficient.

After calculating the locSumAbs value, entropy decoding unit 302 may derive a shift value from the locSumAbs value. For example, entropy decoding unit 302 may calculate the shift value according to "shift=((Bitdepth−b)>0) && (localSumAbs−baseLevel*5)>=T?Floor(Log 2(a*(Bitdepth−b))):0." In this example, Bitdepth represents a bitdepth of the video data, a is an integer power of two value, b represents an operation bit depth, and T represents a threshold value.

After determining the shift value, entropy decoding unit 302 may normalize the calculated locSumAbs value using the shift value. For example, entropy decoding unit 302 may normalize the locSumAbs value according to "localSumAbs=(shift=0)?localSumAbs:(localSumAbs+(1<<(shift−1)))>>shift." In this example, "<<" and ">>" represent bitwise left and right shift operators. In both examples above, the "A?B:C" function indicates that if A is true, value B is returned, whereas if A is false, value C is returned. Entropy decoding unit 302 may also clip the normalized locSumAbs value according to "locSumAbs=Clip3(0, 31, locSumAbs−baseLevel*5)."

After calculating the normalized locSumAbs value, entropy decoding unit 302 may perform a lookup in a lookup table, using the normalized locSumAbs value as input, to determine a Rice parameter (e.g., cRiceParam). The lookup table may be the same as currently in WC and reproduced below as Table 1. Entropy decoding unit 302 may inverse binarize the absolute remainder value of the current transform coefficient using the determined Rice parameter.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a device for binarizing video data, the device including a memory configured to store video data; and one or more processors implemented in circuitry and configured to: calculate a local sum of absolute values (locSumAbs value) of neighboring coefficients to a current coefficient of a current block of video data; derive a shift value from the locSumAbs value; normalize the locSumAbs value using the shift value; determine a Rice parameter using the normalized locSumAbs value; and binarize or inverse binarize the current coefficient using the Rice parameter.

FIG. 5 is a conceptual diagram illustrating an example set of neighboring coefficients that may be used when calculating a local sum of neighboring absolute values (localSumAbs) for a current coefficient. Video encoder 200 and video decoder 300 may use the local sum of neighboring absolute values for the current coefficient to determine a Rice parameter. For example, in VVC, a Rice parameter for regular residual coding (RRC) is derived using a look-up table with consideration of coefficient values of the neighboring transform coefficients in a template. The template of the neighboring coefficients is presented in FIG. 5.

First, video encoder 200 and video decoder 300 may calculate locSumAbs, which is the sum of absolute of five available neighboring coefficients in the template. Video encoder 200 and video decoder 300 may then normalize locSumAbs (subtraction and clip) as follows:

$$locSumAbs=Clip3(0,31,locSumAbs-baseLevel*5)$$

Video encoder 200 and video decoder 300 may derive the Rice parameter value (e.g., cRiceParam) using the lookup table of Table 1 below:

TABLE 1

Look-up table for Rice Parameter based on locSumAbs in VVC

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Figure 6:
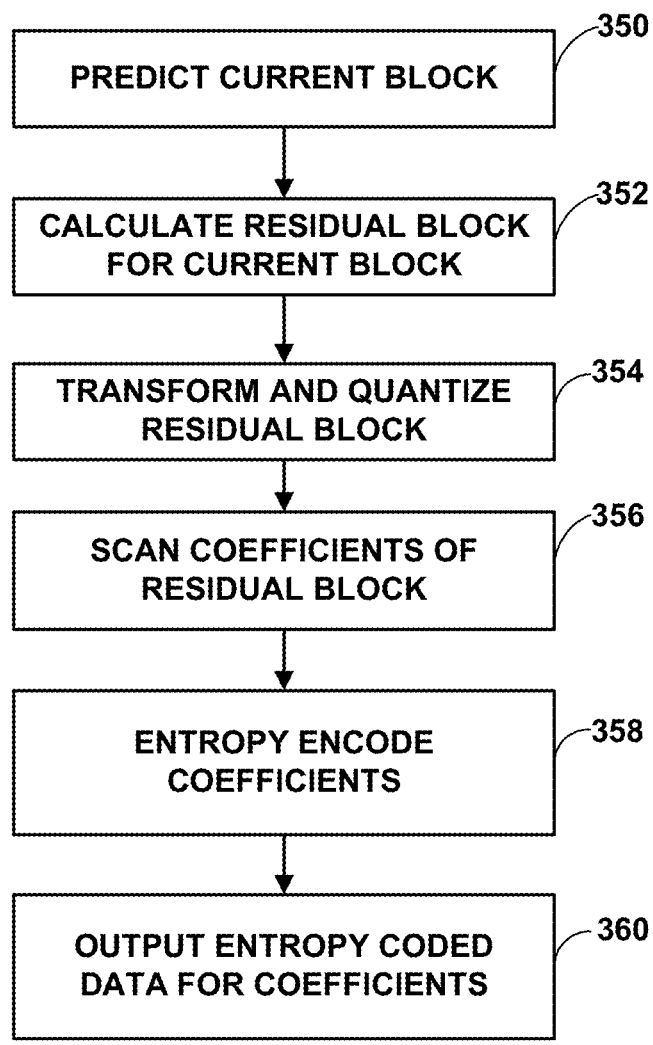
FIG. 6 is a flowchart illustrating an example method for encoding a current block in accordance with the techniques of this disclosure.

FIG. 6 is a flow chart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Figure 7:
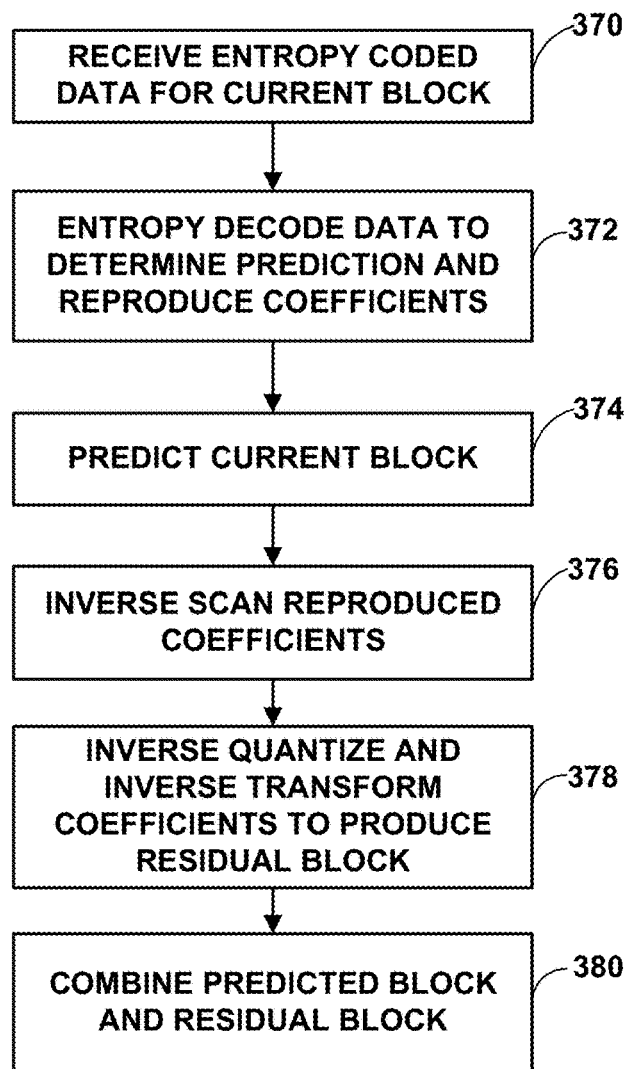
FIG. 7 is a flowchart illustrating an example method for decoding a current block in accordance with the techniques of this disclosure.

FIG. 7 is a flowchart illustrating an example method for decoding a current block in accordance with the techniques of this disclosure. The current block may comprise a current CU. Although described with respect to video decoder 300 (FIGS. 1 and 4), it should be understood that other devices may be configured to perform a method similar to that of FIG. 7.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the quantized transform coefficients to produce a residual block (378). Video decoder 300 may ultimately decode the current block by combining the prediction block and the residual block (380).

Figure 8:
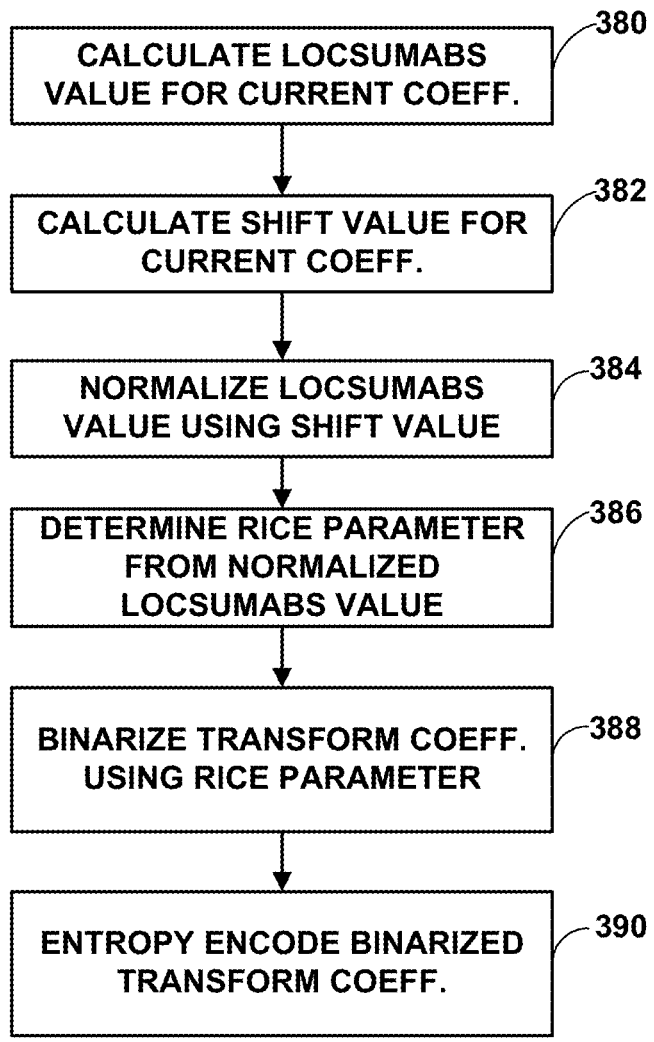
FIG. 8 is a flowchart illustrating an example method of binarizing video data according to the techniques of this disclosure.

FIG. 8 is a flowchart illustrating an example method of binarizing video data according to the techniques of this disclosure. The method of FIG. 8 is explained with respect to video encoder 200 of FIGS. 1 and 3. In other examples, other devices may be configured to perform these or similar techniques. Furthermore, the method of FIG. 8 may generally correspond to a portion of step 358 of FIG. 6.

Initially, video encoder 200 may receive a current transform coefficient. The current transform coefficient may have an absolute value of greater than two. Video encoder 200 may calculate a local sum of absolute values (locSumAbs) value for the current coefficient from neighboring coefficients to the current coefficient (380). For example, video encoder 200 may add absolute values of transform coefficients immediately to the right of the current transform coefficient, two to the right of the current transform coefficient, below and to the right of the current transform coefficient, immediately below the current transform coefficient, and two below the current transform coefficient, as shown in the example of FIG. 5.

Video encoder 200 may then calculate a shift value for the current coefficient from the locSumAbs value (382). For example, video encoder 200 may calculate the shift value according to the formula "shift=((Bitdepth−b)>0) && (localSumAbs−baseLevel*5)>=T?Floor(Log 2(a*(Bitdepth−b))):0." As another example, video encoder 200 may calculate two shift values, shift and shift1, according to the formulas: "shift=((Bitdepth−b)>0) && (localSumAbs−baseLevel*5)>=T?Floor(Log 2(a*(Bitdepth−b))):0" and "shift1=(Bitdepth−b)>0) && (localSumAbs−baseLevel*5)>=T?Floor(Log 2(a*(Bitdepth−b))):0." As yet another example, video encoder 200 may calculate the shift value according to the formula "shift=(locSumAbs*scl)>=T?Floor Log 2((locSumAbs*scl)>>N):0."

Video encoder 200 may then normalize the locSumAbs value using the shift value (384). For example, video encoder 200 may normalize the locSumAbs value according to "localSumAbs=(shift=0)?localSumAbs:(localSumAbs+(1<<(shift−1)))>>shift." As another example, where two shift values (shift and shift1) are used, video encoder 200 may normalize locSumAbs according to "localSumAbs=(shift=0)?localSumAbs:(localSumAbs+(1<<(shift−1)))>>shift" and "localSumAbs=(shift1=0)?localSumAbs:(localSumAbs+(1<<(shift1−1)))>>shift1." As yet another example, video encoder 200 may normalize locSumAbs according to "locSumAbs=locSumAbs>>shift."

Video encoder 200 may then determine a Rice parameter from the normalized locSumAbs value (386). For example, video encoder 200 may determine the Rice parameter using Table 1 above.

Video encoder 200 may then binarize the transform coefficient using the determined Rice parameter (388). Finally, video encoder 200 may entropy encode the binarized transform coefficient (390).

In this manner, the method of FIG. 8 represents an example of a method including calculating a local sum of absolute values (locSumAbs value) of neighboring coefficients to a current coefficient of a current block of video data; deriving a shift value from the locSumAbs value;

normalizing the locSumAbs value using the shift value; determining a Rice parameter using the normalized locSumAbs value; and binarizing or inverse binarizing the current coefficient using the Rice parameter.

Figure 9:
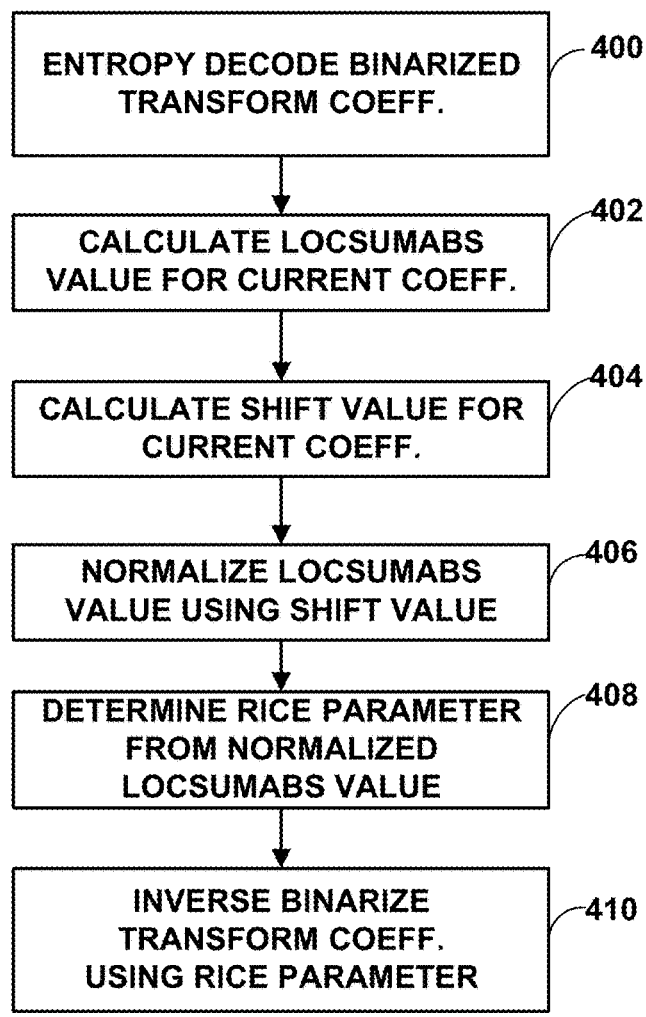
FIG. 9 is a flowchart illustrating an example method of inverse binarizing video data according to the techniques of this disclosure.

FIG. 9 is a flowchart illustrating an example method of inverse binarizing video data according to the techniques of this disclosure.

Initially, video decoder 300 may receive binarized, entropy encoded data for a current transform coefficient. In particular, video decoder 300 may entropy decode syntax elements for the entropy encoded transform coefficient including a significant flag, a greater than 1 flag, and a greater than two flag, indicating that the transform coefficient has a value greater than two. Thus, video decoder 300 may determine that a remainder value for the transform coefficient is to be decoded. As such, video decoder 300 may initially entropy decode the binarized transform coefficient (namely, the remainder value for the binarized transform coefficient) (400).

Video decoder 300 may then calculate a local sum of absolute values (locSumAbs) value for the current coefficient from neighboring coefficients to the current coefficient (402). For example, video decoder 300 may add absolute values of transform coefficients immediately to the right of the current transform coefficient, two to the right of the current transform coefficient, below and to the right of the current transform coefficient, immediately below the current transform coefficient, and two below the current transform coefficient, as shown in the example of FIG. 5.

Video decoder 300 may then calculate a shift value for the current coefficient from the locSumAbs value (404). For example, video decoder 300 may calculate the shift value according to the formula "shift=((Bitdepth−b)>0) && (localSumAbs−baseLevel*5)>=T?Floor(Log 2(a*(Bitdepth−b))):0." As another example, video decoder 300 may calculate two shift values, shift and shift1, according to the formulas: "shift=((Bitdepth−b)>0) && (localSumAbs−baseLevel*5)>=T?Floor(Log 2(a*(Bitdepth−b))):0" and "shift1=(Bitdepth−b)>0) && (localSumAbs−baseLevel*5)>=T?Floor(Log 2(a*(Bitdepth−b))):0." As yet another example, video decoder 300 may calculate the shift value according to the formula "shift=(locSumAbs*scl)>=T?Floor Log 2((locSumAbs*scl)>>N):0."

Video decoder 300 may then normalize the locSumAbs value using the shift value (406). For example, video decoder 300 may normalize the locSumAbs value according to "localSumAbs=(shift=0)?localSumAbs:(localSumAbs+(1<<(shift−1)))>>shift." As another example, where two shift values (shift and shift1) are used, video decoder 300 may normalize locSumAbs according to "localSumAbs=(shift=0)?localSumAbs:(localSumAbs+(1<<(shift−1)))>>shift" and "localSumAbs=(shift==0)?localSumAbs:(localSumAbs+(1<<(shift−1)))>>shift." As yet another example, video decoder 300 may normalize locSumAbs according to "locSumAbs=locSumAbs>>shift."

Video decoder 300 may then determine a Rice parameter from the normalized locSumAbs value (408). For example, video decoder 300 may determine the Rice parameter using Table 1 above. Video decoder 300 may then inverse binarize the transform coefficient (in particular, the remainder value) using the determined Rice parameter (410).

In this manner, the method of FIG. 9 represents an example of a method including calculating a local sum of absolute values (locSumAbs value) of neighboring coefficients to a current coefficient of a current block of video data; deriving a shift value from the locSumAbs value; normalizing the locSumAbs value using the shift value; determining a Rice parameter using the normalized locSumAbs value; and binarizing or inverse binarizing the current coefficient using the Rice parameter.

The following clauses summarize certain example techniques of this disclosure:

Clause 1: A method of decoding video data, the method comprising: deriving a Rice parameter according to any of the techniques of this disclosure; and decoding video data using the Rice parameter.

Clause 2: The method of clause 1, wherein deriving the Rice parameter comprises: determining a local sum of absolute values of neighboring coefficients to a current coefficient; and scaling the local sum of absolute values using a scaling value.

Clause 3: The method of clause 2, further comprising determining the scaling value according to one or more of an input bit depth, a predefined operation bit depth, local activity of transform coefficients, a block size, or a syntax element signaled in a bitstream including the video data.

Clause 4: The method of any of clauses 2 and 3, further comprising clipping the local sum of absolute values.

Clause 5: The method of any of clauses 2-4, further comprising normalizing the local sum of absolute values.

Clause 6: The method of any of clauses 2-5, wherein deriving the Rice parameter comprises deriving the Rice parameter (cRiceParam) from the local sum of absolute values (locSumAbs) according to the following table:

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Clause 7: The method of any of clauses 2-6, wherein determining the local sum of absolute values comprises calculating localSumAbs=(shift=0)?localSumAbs:(localSumAbs+(1<<(shift−1)))>>shift.

Clause 8: The method of clause 7, further comprising calculating the value of shift as shift=(Bitdepth−b)>0?Floor (Log 2(a*(Bitdepth−b))):0.

Clause 9: The method of clause 8, wherein Bitdepth specifies a bit depth for the video data, b specifies an operation bitdepth, a is set equal to an integer value power of 2, and c is set according to a computed shift value.

Clause 10: The method of clause 7, further comprising calculating the value of shift as shift=(Bitdepth−b)>0) && (localSumAbs−baseLevel*5)>=T?Floor(Log 2(a*(Bitdepth−b))):0.

Clause 11: The method of clause 10, wherein T is a predefined threshold value.

Clause 12: The method of any of clauses 2-6, wherein determining the local sum of absolute values comprises calculating: localSumAbs=(shift=0)?localSumAbs:(localSumAbs+(1<<(shift−1)))>>shift; and localSumAbs=(shift1=0)?localSumAbs:(localSumAbs+(1<<(shift1−1)))>>shift.

Clause 13: The method of clause 15, further comprising calculating the values of shift and shift as: shift=(Bitdepth−b)>0) && (localSumAbs−baseLevel*5)>=T?Floor(Log 2(a*(Bitdepth−b))):0; and shift=(Bitdepth−b)>0) && (localSumAbs−baseLevel*5)>=T?Floor 2(a*(Bitdepth−b))):0.

Clause 14: The method of clause 13, wherein T is a threshold value, Bitdepth specifies a bit depth for the video data, b specifies an operation bitdepth, and a is set equal to an integer value power of 2.

Clause 15: The method of any of clauses 2-6, wherein determining the local sum of absolute values comprises calculating: shift=(locSumAbs*scl)>=T?Floor Log 2((locSumAbs*scl)>>N):0; locSumAbs=locSumAbs>>shift; locSumAbs=Clip3(0, 31, locSumAbs−baseLevel*5).

Clause 16: The method of clause 15, wherein T is a threshold value, scl is a scaling value, and N is a number of bits.

Clause 17: The method of clause 16, further comprising determining values for one or more of T, scl, and N according to a bitdepth for a bitstream including the video data.

Clause 18: The method of clause 16, further comprising determining values for one or more of T, scl, and N from signaled data in a bitstream including the video data.

Clause 19: The method of clause 18, wherein the signaled data comprises data of one or more of a sequence parameter set (SPS), a picture parameter set (PPS), an adaptation parameter set (APS), or a slice header.

Clause 20: The method of clause 16, further comprising determining a value of 8 for T, a value of 3 for N, and scl=floor Log 2(bitdepth−10), wherein bitdepth has a value representing a bitdepth for a bitstream including the video data.

Clause 21: The method of clause 16, further comprising determining predetermined values for one or more of T, scl, and N.

Clause 22: The method of any of clauses 7-20, further comprising deriving a temporary Rice parameter value using the value of localSumAbs, then calculating the Rice parameter as the sum of the temporary Rice parameter value and a variable c.

Clause 23: The method of clause 21, further comprising determining the value of c as being equal to the value of shift.

Clause 24: The method of clause 21, further comprising deriving the value of c from the value of shift.

Clause 25: The method of any of clauses 1-23, further comprising encoding the video data prior to decoding the video data.

Clause 26: A device for decoding video data, the device comprising one or more means configured to perform the method of any of clauses 1-25.

Clause 27: The device of clause 26, wherein the one or more means comprise one or more processors implemented in circuitry.

Clause 28: The device of clause 26, further comprising a display configured to display the decoded video data.

Clause 29: The device of clause 26, wherein the device comprises one or more of a camera, a computer, a mobile device, a broadcast receiver device, or a set-top box.

Clause 30: The device of clause 26, further comprising a memory configured to store the video data.

Clause 31: A computer-readable storage medium having stored thereon instructions that, when executed, cause a processor to perform the method of any of clauses 1-25.

Clause 32: A method of binarizing video data, the method comprising: calculating a local sum of absolute values (locSumAbs value) of neighboring coefficients to a current coefficient of a current block of video data; deriving a shift value from the locSumAbs value; normalizing the locSumAbs value using the shift value; determining a Rice parameter using the normalized locSumAbs value; and binarizing or inverse binarizing the current coefficient using the Rice parameter.

Clause 33: The method of clause 32, further comprising context-adaptive binary arithmetic coding (CABAC) encoding or decoding the current coefficient using the Rice parameter.

Clause 34: The method of clause 32, wherein normalizing the locSumAbs value comprises bitwise right-shifting the locSumAbs value using the shift value.

Clause 35: The method of clause 32, further comprising clipping the normalized locSumAbs value.

Clause 36: The method of clause 32, wherein determining the Rice parameter comprises deriving the Rice parameter from the normalized locSumAbs value according to a lookup table.

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 | and wherein the Rice parameter comprises cRiceParam.

Clause 38: The method of clause 32, wherein calculating the locSumAbs value and normalizing the locSumAbs value comprises calculating the localSumAbs value as being equal to (shift=0)?localSumAbs:(localSumAbs+(1<<(shift−1)))>>shift.

Clause 39: The method of clause 38, wherein deriving the value of shift comprises calculating the value of shift as shift=(Bitdepth−b)>0?Floor(Log 2(a*(Bitdepth−b))):0.

Clause 40: The method of clause 39, wherein Bitdepth specifies a bit depth for the video data, b specifies an operation bitdepth, a is set equal to an integer value power of 2, and c is set according to a computed shift value.

Clause 41: The method of clause 38, wherein deriving the shift value comprises calculating the value of shift as shift=((Bitdepth−b)>0) && (localSumAbs−baseLevel*5)>=T?Floor(Log 2(a*(Bitdepth−b))):0.

Clause 42: The method of clause 41, wherein T is a predefined threshold value.

Clause 43: The method of clause 32, wherein deriving the shift value further comprises deriving the shift value according to one or more of an input bit depth, a predefined operation bit depth, local activity of transform coefficients, a block size, or a syntax element signaled in a bitstream including the video data.

Clause 44: The method of clause 32, wherein calculating the locSumAbs value and normalizing the locSumAbs value comprises calculating: localSumAbs=(shift=0)?localSumAbs:(localSumAbs+(1<<(shift−1)))>>shift; and localSumAbs=(shift1=0)?localSumAbs:(localSumAbs+(1<<(shift1−1))) shift1.

Clause 45: The method of clause 44, wherein deriving the shift value comprises calculating the values of shift and shift1 as: shift=((Bitdepth−b)>0) && (localSumAbs−baseLevel*5)>=T?Floor(Log 2(a*(Bitdepth−b))):0; and shift1=((Bitdepth−b)>0) && (localSumAbs−baseLevel*5)>=T?Floor(Log 2(a*(Bitdepth−b))):0.

Clause 46: The method of clause 45, wherein T is a threshold value, Bitdepth specifies a bit depth for the video data, b specifies an operation bitdepth, and a is set equal to an integer value power of 2.

Clause 47: The method of clause 32, wherein calculating the locSumAbs value, deriving the shift value, and normalizing the locSumAbs value comprises calculating: shift=(locSumAbs*scl)>=T?Floor Log 2((locSumAbs*scl)>>N):0; locSumAbs=locSumAbs>>shift; locSumAbs=Clip3(0, 31, locSumAbs−baseLevel*5).

Clause 48: The method of clause 47, wherein T is a threshold value, scl is a scaling value, and N is a number of bits.

Clause 49: The method of clause 48, further comprising determining values for one or more of T, scl, and N according to a bitdepth for a bitstream including the video data.

Clause 50: The method of clause 48, further comprising determining values for one or more of T, scl, and N from signaled data in a bitstream including the video data.

Clause 51: The method of clause 50, wherein the signaled data comprises data of one or more of a sequence parameter set (SPS), a picture parameter set (PPS), an adaptation parameter set (APS), or a slice header.

Clause 52: The method of clause 48, further comprising determining a value of 8 for T, a value of 3 for N, and scl=floor Log 2(bitdepth−10), wherein bitdepth has a value representing a bitdepth for a bitstream including the video data.

Clause 53: The method of clause 48, further comprising determining predetermined values for one or more of T, scl, and N.

Clause 54: The method of clause 32, further comprising deriving a temporary Rice parameter value using the localSumAbs value, wherein determining the Rice parameter comprises calculating the Rice parameter as a sum of the temporary Rice parameter value and a variable c.

Clause 55: The method of clause 54, further comprising determining the value of c as being equal to the shift value.

Clause 56: The method of clause 54, further comprising deriving the value of c from the shift value.

Clause 57: The method of clause 32, further comprising encoding or decoding the video data.

Clause 58: A device for binarizing video data, the device comprising: a memory configured to store video data; and one or more processors implemented in circuitry and configured to: calculate a local sum of absolute values (locSumAbs value) of neighboring coefficients to a current coefficient of a current block of video data; derive a shift value from the locSumAbs value; normalize the locSumAbs value using the shift value; determine a Rice parameter using the normalized locSumAbs value; and binarize or inverse binarize the current coefficient using the Rice parameter.

Clause 59: The device of clause 58, wherein the one or more processors are configured to context-adaptive binary arithmetic coding (CABAC) encode or decode the current coefficient.

Clause 60: The device of clause 58, wherein to normalize the locSumAbs value, the one or more processors are configured to bitwise right-shift the locSumAbs value using the shift value.

Clause 61: The device of clause 58, wherein the one or more processors are further configured to clip the normalized locSumAbs value.

Clause 62: The device of clause 58, wherein to determine the Rice parameter, the one or more processors are configured to derive the Rice parameter from the normalized locSumAbs value according to a lookup table.

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 | and wherein the Rice parameter comprises cRiceParam.

Clause 64: The device of clause 58, further comprising a display configured to display the decoded video data.

Clause 65: The device of clause 58, wherein the device comprises one or more of a camera, a computer, a mobile device, a broadcast receiver device, or a set-top box.

Clause 66: A computer-readable storage medium having stored thereon instructions that, when executed, cause a processor to: calculate a local sum of absolute values (locSumAbs value) of neighboring coefficients to a current coefficient of a current block of video data; derive a shift value from the locSumAbs value; normalize the locSumAbs value using the shift value; determine a Rice parameter using the normalized locSumAbs value; and binarize or inverse binarize the current coefficient using the Rice parameter.

Clause 67: The computer-readable storage medium of clause 66, further comprising instructions that cause the processor to context-adaptive binary arithmetic coding (CABAC) encode or decode the current coefficient.

Clause 68: The computer-readable storage medium of clause 66, wherein the instructions that cause the processor to normalize the locSumAbs value comprise instructions that cause the processor to bitwise right-shifting the locSumAbs value using the shift value.

Clause 69: The computer-readable storage medium of clause 66, further comprising instructions that cause the processor to clip the normalized locSumAbs value.

Clause 70: The computer-readable storage medium of clause 66, wherein the instructions that cause the processor to determine the Rice parameter comprise instructions that cause the processor to derive the Rice parameter from the normalized locSumAbs value according to a lookup table.

Clause 71: The computer-readable storage medium of clause 70, wherein the lookup table comprises:

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 | and wherein the Rice parameter comprises cRiceParam.

Clause 72: A device for binarizing video data, the device comprising: means for calculating a local sum of absolute values (locSumAbs value) of neighboring coefficients to a current coefficient of a current block of video data; means for deriving a shift value from the locSumAbs value; means for normalizing the locSumAbs value using the shift value; means for determining a Rice parameter using the normalized locSumAbs value; and means for binarizing or inverse binarizing the current coefficient using the Rice parameter.

Clause 73: The device of clause 72, further comprising means for context-adaptive binary arithmetic coding (CABAC) encoding or decoding the current coefficient.

Clause 74: The device of clause 72, wherein the means for normalizing the locSumAbs value comprises means for bitwise right-shifting the locSumAbs value using the shift value.

Clause 75: The device of clause 72, further comprising means for clipping the normalized locSumAbs value.

Clause 76: The device of clause 72, wherein the means for determining the Rice parameter comprises means for deriving the Rice parameter from the normalized locSumAbs value according to a lookup table.

Clause 77: The device of clause 76, wherein the lookup table comprises:

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 | and wherein the Rice parameter comprises cRiceParam.

Clause 78: A method of binarizing video data, the method comprising: calculating a local sum of absolute values (locSumAbs value) of neighboring coefficients to a current coefficient of a current block of video data; deriving a shift value from the locSumAbs value; normalizing the locSumAbs value using the shift value; determining a Rice parameter using the normalized locSumAbs value; and binarizing or inverse binarizing the current coefficient using the Rice parameter.

Clause 79: The method of clause 78, further comprising context-adaptive binary arithmetic coding (CABAC) encoding or decoding the current coefficient.

Clause 80: The method of any of clauses 78 and 79, wherein normalizing the locSumAbs value comprises bitwise right-shifting the locSumAbs value using the shift value.

Clause 81: The method of any of clauses 78-80, further comprising clipping the normalized locSumAbs value.

Clause 82: The method of any of clauses 78-81, wherein determining the Rice parameter comprises deriving the Rice parameter from the normalized locSumAbs value according to a lookup table.

Clause 83: The method of clause 82, wherein the lookup table comprises:

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 | and wherein the Rice parameter comprises cRiceParam.

Clause 84: The method of any of clauses 78-83, wherein calculating the locSumAbs value and normalizing the locSumAbs value comprises calculating the localSumAbs value as being equal to (shift==0)?localSumAbs:(localSumAbs+(1<<(shift−1)))>>shift.

Clause 85: The method of clause 84, wherein deriving the value of shift comprises calculating the value of shift as shift=(Bitdepth−b)>0?Floor(Log 2(a*(Bitdepth−b))):0.

Clause 86: The method of clause 85, wherein Bitdepth specifies a bit depth for the video data, b specifics an operation bitdepth, a is set equal to an integer value power of 2, and c is set according to a computed shift value.

Clause 87: The method of any of clauses 84-86, wherein deriving the shift value comprises calculating the value of shift as shift=((Bitdepth−b)>0) && (localSumAbs−baseLevel*5)>=T?Floor(Log 2(a*(Bitdepth−b))):0.

Clause 88: The method of clause 87, wherein T is a predefined threshold value.

Clause 89: The method of any of clauses 78-88, wherein deriving the shift value further comprises deriving the shift value according to one or more of an input bit depth, a predefined operation bit depth, local activity of transform coefficients, a block size, or a syntax element signaled in a bitstream including the video data.

Clause 90: The method of any of clauses 78-88, wherein calculating the locSumAbs value and normalizing the locSumAbs value comprises calculating: localSumAbs=(shift=0)?localSumAbs:(localSumAbs+(1<<(shift−1)))>>shift; and localSumAbs=(shift1=0)?localSumAbs:(localSumAbs+(1<<(shift1−1)))>>shift1.

Clause 91: The method of clause 90, wherein deriving the shift value comprises calculating the values of shift and shift1 as: shift=((Bitdepth−b)>0) && (localSumAbs−baseLevel*5)>=T?Floor(Log 2(a*(Bitdepth−b))):0; and shift=((Bitdepth−b)>0) && (localSumAbs−baseLevel*5)>=T?Floor(Log 2(a*(Bitdepth−b))):0.

Clause 92: The method of clause 91, wherein T is a threshold value, Bitdepth specifies a bit depth for the video data, b specifies an operation bitdepth, and a is set equal to an integer value power of 2.

Clause 93: The method of any of clauses 78-92, wherein calculating the locSumAbs value, deriving the shift value, and normalizing the locSumAbs value comprises calculating: shift=(locSumAbs*scl)>=T?Floor Log 2((locSumAbs*scl)>>N):0; locSumAbs=locSumAbs>>shift; locSumAbs=Clip3(0, 31, locSumAbs−baseLevel*5).

Clause 94: The method of clause 93, wherein T is a threshold value, scl is a scaling value, and N is a number of bits.

Clause 95: The method of clause 94, further comprising determining values for one or more of T, scl, and N according to a bitdepth for a bitstream including the video data.

Clause 96: The method of clause 94, further comprising determining values for one or more of T, scl, and N from signaled data in a bitstream including the video data.

Clause 97: The method of clause 96, wherein the signaled data comprises data of one or more of a sequence parameter set (SPS), a picture parameter set (PPS), an adaptation parameter set (APS), or a slice header.

Clause 98: The method of clause 94, further comprising determining a value of 8 for T, a value of 3 for N, and scl=floor Log 2(bitdepth−10), wherein bitdepth has a value representing a bitdepth for a bitstream including the video data.

Clause 99: The method of clause 94, further comprising determining predetermined values for one or more of T, scl, and N.

Clause 100: The method of any of clauses 78-99, further comprising deriving a temporary Rice parameter value using the localSumAbs value, wherein determining the Rice parameter comprises calculating the Rice parameter as a sum of the temporary Rice parameter value and a variable c.

Clause 101: The method of clause 54, further comprising determining the value of c as being equal to the shift value.

Clause 102: The method of clause 54, further comprising deriving the value of c from the shift value.

Clause 103: The method of any of clauses 78-102, further comprising encoding or decoding the video data.

Clause 104: A device for binarizing video data, the device comprising: a memory configured to store video data; and one or more processors implemented in circuitry and configured to: calculate a local sum of absolute values (locSumAbs value) of neighboring coefficients to a current coefficient of a current block of video data; derive a shift value from the locSumAbs value; normalize the locSumAbs value using the shift value; determine a Rice parameter using the normalized locSumAbs value; and binarize or inverse binarize the current coefficient using the Rice parameter.

Clause 105: The device of clause 104, wherein the one or more processors are configured to context-adaptive binary arithmetic coding (CABAC) encode or decode the current coefficient.

Clause 106: The device of any of clauses 104 and 105, wherein to normalize the locSumAbs value, the one or more processors are configured to bitwise right-shift the locSumAbs value using the shift value.

Clause 107: The device of any of clauses 104-106, wherein the one or more processors are further configured to clip the normalized locSumAbs value.

Clause 108: The device of any of clauses 104-107, wherein to determine the Rice parameter, the one or more processors are configured to derive the Rice parameter from the normalized locSumAbs value according to a lookup table.

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 | and wherein the Rice parameter comprises cRiceParam.

Clause 110: The device of any of clauses 104-109, further comprising a display configured to display the decoded video data.

Clause 111: The device of any of clauses 104-110, wherein the device comprises one or more of a camera, a computer, a mobile device, a broadcast receiver device, or a set-top box.

Clause 112: A computer-readable storage medium having stored thereon instructions that, when executed, cause a processor to: calculate a local sum of absolute values (locSumAbs value) of neighboring coefficients to a current coefficient of a current block of video data; derive a shift value from the locSumAbs value; normalize the locSumAbs value using the shift value; determine a Rice parameter using the normalized locSumAbs value; and binarize or inverse binarize the current coefficient using the Rice parameter.

Clause 113: The computer-readable storage medium of clause 112, further comprising instructions that cause the processor to context-adaptive binary arithmetic coding (CABAC) encode or decode the current coefficient.

Clause 114: The computer-readable storage medium of any of clauses 112 and 113, wherein the instructions that cause the processor to normalize the locSumAbs value comprise instructions that cause the processor to bitwise right-shifting the locSumAbs value using the shift value.

Clause 115: The computer-readable storage medium of any of clauses 112-114, further comprising instructions that cause the processor to clip the normalized locSumAbs value.

Clause 116: The computer-readable storage medium of any of clauses 112-115, wherein the instructions that cause the processor to determine the Rice parameter comprise instructions that cause the processor to derive the Rice parameter from the normalized locSumAbs value according to a lookup table.

Clause 117: The computer-readable storage medium of clause 116, wherein the lookup table comprises:

| locSumAbs  | 0  | 1  | 2  | 3  | 4  | 5  | 6  | 7  | 8  | 9  | 10 | 11 | 12 | 13 | 14 | 15 |
|------------|----|----|----|----|----|----|----|----|----|----|----|----|----|----|----|----|
| cRiceParam | 0  | 0  | 0  | 0  | 0  | 0  | 0  | 1  | 1  | 1  | 1  | 1  | 1  | 1  | 2  | 2  |
| locSumAbs  | 16 | 17 | 18 | 19 | 20 | 21 | 22 | 23 | 24 | 25 | 26 | 27 | 28 | 29 | 30 | 31 |
| cRiceParam | 2  | 2  | 2  | 2  | 2  | 2  | 2  | 2  | 2  | 2  | 2  | 2  | 3  | 3  | 3  | 3  | and wherein the Rice parameter comprises cRiceParam.

Clause 118: A device for binarizing video data, the device comprising: means for calculating a local sum of absolute values (locSumAbs value) of neighboring coefficients to a current coefficient of a current block of video data; means for deriving a shift value from the locSumAbs value; means for normalizing the locSumAbs value using the shift value; means for determining a Rice parameter using the normalized locSumAbs value; and means for binarizing or inverse binarizing the video data using the Rice parameter.

Clause 119: The device of clause 118, further comprising means for context-adaptive binary arithmetic coding (CABAC) encoding or decoding the current coefficient.

Clause 120: The device of any of clauses 118 and 119, wherein the means for normalizing the locSumAbs value comprises means for bitwise right-shifting the locSumAbs value using the shift value.

Clause 121: The device of any of clauses 118-120, further comprising means for clipping the normalized locSumAbs value.

Clause 122: The device of any of clauses 118-121, wherein the means for determining the Rice parameter comprises means for deriving the Rice parameter from the normalized locSumAbs value according to a lookup table.

Clause 123: The device of clause 122, wherein the lookup table comprises:

| locSumAbs  | 0  | 1  | 2  | 3  | 4  | 5  | 6  | 7  | 8  | 9  | 10 | 11 | 12 | 13 | 14 | 15 |
|------------|----|----|----|----|----|----|----|----|----|----|----|----|----|----|----|----|
| cRiceParam | 0  | 0  | 0  | 0  | 0  | 0  | 0  | 1  | 1  | 1  | 1  | 1  | 1  | 1  | 2  | 2  |
| locSumAbs  | 16 | 17 | 18 | 19 | 20 | 21 | 22 | 23 | 24 | 25 | 26 | 27 | 28 | 29 | 30 | 31 |
| cRiceParam | 2  | 2  | 2  | 2  | 2  | 2  | 2  | 2  | 2  | 2  | 2  | 2  | 3  | 3  | 3  | 3  | and wherein the Rice parameter comprises cRiceParam.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly; the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of binarizing or inverse binarizing video data, the method comprising:
    calculating a local sum of absolute values (locSumAbs value) of neighboring coefficients to a current coefficient of a current block of video data;
    deriving a shift value from at least one of a bit depth of the video data or the locSumAbs value;
    normalizing the locSumAbs value using the shift value to generate a normalized locSumAbs value;
    determining a Rice parameter using the normalized locSumAbs value; and
    binarizing or inverse binarizing the current coefficient using the Rice parameter.

2. The method of claim 1, further comprising context-adaptive binary arithmetic coding (CABAC) encoding or CABAC decoding the current coefficient.

3. The method of claim 1, wherein normalizing the locSumAbs value comprises bitwise right-shifting the locSumAbs value using the shift value to generate the normalized locSumAbs value.

4. The method of claim 1, further comprising clipping the normalized locSumAbs value.

5. The method of claim 1, wherein determining the Rice parameter comprises deriving the Rice parameter from the normalized locSumAbs value according to a lookup table.

6. The method of claim 5, wherein the lookup table comprises:

wherein the Rice parameter comprises cRiceParam, the method further comprising updating the Rice parameter according to cRiceParam=cRiceParam+c, wherein c is determined based on the shift value.

7. The method of claim 1, wherein calculating the locSumAbs value and normalizing the locSumAbs value comprises calculating the locSumAbs value as being equal to (shift==0)? locSumAbs:(locSumAbs+(1<<(shift−1)))>>shift.

8. The method of claim 7, wherein deriving the shift value comprises calculating the shift value as shift=(Bitdepth−b)>0 ? Floor(Log 2(a*(Bitdepth−b))): 0.

9. The method of claim 8, wherein Bitdepth specifies a bit depth for the video data, b specifies an operation bitdepth, and a is set equal to an integer value power of 2.

10. The method of claim 7, wherein deriving the shift value comprises calculating the shift value according to (Bitdepth−b)>0) && (locSumAbs−baseLevel*5)>=T? Floor (Log 2(a*(Bitdepth−b))): 0.

11. The method of claim 10, wherein T is a predefined threshold value.

12. The method of claim 1, wherein deriving the shift value further comprises deriving the shift value according to one or more of an input bit depth, a predefined operation bit depth, local activity of transform coefficients, a block size, or a syntax element signaled in a bitstream including the video data.

13. The method of claim 1, wherein calculating the locSumAbs value and normalizing the locSumAbs value comprises calculating:

intermediateLocSumAbs=(shift==0)?locSumAbs:
       (locSumAbs+(1<<(shift−1)))>>shift; and normalizedLocSumAbs=(shift1==0)?intermediate-
       LocSumAbs:(intermediateLocSumAbs+
       (1<<(shift1−1)))>>shift1.

14. The method of claim 13, wherein deriving the shift value comprises calculating the values of shift and shift1 as:

shift=((Bitdepth−$b$)>0)&&(locSumAbs−
       baseLevel*5)>=$T$?Floor
       (Log 2($a$*(Bitdepth−$b$))):0; and shift1=((Bitdepth−$b$)>0)&&(intermediateLocSum-
       Abs−baseLevel*5)>=$T$?Floor(Log 2($a$*(Bit-
       depth−$b$))):0.

15. The method of claim 14, wherein T is a threshold value, baseLevel represents an original value for the current coefficient, Bitdepth specifies a bit depth for the video data, b specifies an operation bitdepth, and a is set equal to an integer value power of 2.

16. The method of claim 1, wherein calculating the locSumAbs value, deriving the shift value, and normalizing the locSumAbs value comprises calculating:

shift=(locSumAbs*$scl$)>=$T$?Floor Log
       2((locSumAbs*$scl$)>>$N$):0;

locSumAbs=locSumAbs>>shift;

locSumAbs=Clip3(0,31,locSumAbs—baseLevel*5).

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

17. The method of claim 16, wherein T is a threshold value, scl is a scaling value, and N is a number of bits.

18. The method of claim 17, further comprising determining values for one or more of T, scl, and N according to a bitdepth for a bitstream including the video data.

19. The method of claim 17, further comprising determining values for one or more of T, scl, and N from signaled data in a bitstream including the video data.

20. The method of claim 19, wherein the signaled data comprises data of one or more of a sequence parameter set (SPS), a picture parameter set (PPS), an adaptation parameter set (APS), or a slice header.

21. The method of claim 17, further comprising determining a value of 8 for T, a value of 3 for N, and scl=floor Log 2(bitdepth−10), wherein bitdepth has a value representing a bitdepth for a bitstream including the video data.

22. The method of claim 17, further comprising determining predetermined values for one or more of T, scl, and N.

23. The method of claim 1, further comprising deriving a temporary Rice parameter value using the locSumAbs value, wherein determining the Rice parameter comprises calculating the Rice parameter as a sum of the temporary Rice parameter value and a variable c.

24. The method of claim 23, further comprising determining the value of c as being equal to the shift value.

25. The method of claim 23, further comprising deriving the value of c from the shift value.

26. A device for binarizing or inverse binarizing video data, the device comprising:
a memory configured to store video data; and
one or more processors implemented in circuitry and configured to:
calculate a local sum of absolute values (locSumAbs value) of neighboring coefficients to a current coefficient of a current block of video data;
derive a shift value from at least one of a bit depth of the video data or the locSumAbs value;
normalize the locSumAbs value using the shift value to generate a normalized locSumAbs value;
determine a Rice parameter using the normalized locSumAbs value; and
binarize or inverse binarize the current coefficient using the Rice parameter.

27. The device of claim 26, wherein the one or more processors are configured to context-adaptive binary arithmetic coding (CABAC) encode or decode the current coefficient.

28. The device of claim 26, wherein to normalize the locSumAbs value, the one or more processors are configured to bitwise right-shift the locSumAbs value using the shift value.

29. The device of claim 26, wherein the one or more processors are further configured to clip the normalized locSumAbs value.

30. The device of claim 26, wherein to determine the Rice parameter, the one or more processors are configured to derive the Rice parameter from the normalized locSumAbs value according to a lookup table.

31. The device of claim 30, wherein the lookup table comprises:

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 | wherein the Rice parameter comprises cRiceParam, and wherein the one or more processors are further configured to update the Rice parameter according to cRiceParam=cRiceParam+c, wherein c is determined based on the shift value.

32. The device of claim 26, further comprising a display configured to display the video data.

33. The device of claim 26, wherein the device comprises one or more of a camera, a computer, a mobile device, a broadcast receiver device, or a set-top box.

34. A computer-readable storage medium having stored thereon instructions that, when executed, cause a processor to:
calculate a local sum of absolute values (locSumAbs value) of neighboring coefficients to a current coefficient of a current block of video data;
derive a shift value from at least one of a bit depth of the video data or the locSumAbs value;
normalize the locSumAbs value using the shift value to generate a normalized locSumAbs value;
determine a Rice parameter using the normalized locSumAbs value; and
binarize or inverse binarize the current coefficient using the Rice parameter.

35. A device for decoding video data, the device comprising:
means for calculating a local sum of absolute values (locSumAbs value) of neighboring coefficients to a current coefficient of a current block of video data;
means for deriving a shift value from at least one of a bit depth of the video data or the locSumAbs value;
means for normalizing the locSumAbs value using the shift value to generate a normalized locSumAbs value;
means for determining a Rice parameter using the normalized locSumAbs value; and
means for decoding the video data using the Rice parameter.

* * * * *